United States Patent
Sinz

(10) Patent No.: US 9,497,982 B1
(45) Date of Patent: Nov. 22, 2016

(54) METHOD AND SYSTEM FOR MANUFACTURING FROZEN SUSHI THAT REMAINS STABLE UNTIL CONSUMPTION FOLLOWING THAWING AND REFRIGERATION

(71) Applicant: Philip Sinz, Seattle, WA (US)

(72) Inventor: Philip Sinz, Seattle, WA (US)

( * ) Notice: Subject to any disclaimer, the term of this patent is extended or adjusted under 35 U.S.C. 154(b) by 0 days.

(21) Appl. No.: 14/685,534

(22) Filed: Apr. 13, 2015

Related U.S. Application Data

(63) Continuation-in-part of application No. 13/601,189, filed on Aug. 31, 2012, now abandoned.

(60) Provisional application No. 61/529,713, filed on Aug. 31, 2011.

(51) Int. Cl.
*A23L 3/37* (2006.01)
*A23L 1/182* (2006.01)
*A23L 1/105* (2006.01)

(52) U.S. Cl.
CPC .............. *A23L 1/182* (2013.01); *A23L 1/1055* (2013.01)

(58) Field of Classification Search
CPC ....... A23L 1/182; A23L 1/1826; A23L 3/36; A23L 3/361; A23L 3/37; A23L 1/10; C12J 1/00
USPC ....... 426/618, 112, 658, 512, 517, 518, 520, 426/524
See application file for complete search history.

(56) References Cited

U.S. PATENT DOCUMENTS

| | | | |
|---|---|---|---|
| 6,436,462 B1 * | 8/2002 | Takami .................. | A23L 1/182 426/112 |
| 2009/0186140 A1 * | 7/2009 | Fukushima ........... | A23L 1/0522 426/573 |
| 2011/0117259 A1 * | 5/2011 | Storek .................. | A23L 1/0128 426/509 |
| 2012/0045564 A1 * | 2/2012 | Tachibe .............. | A23L 1/05223 426/618 |

FOREIGN PATENT DOCUMENTS

| JP | 5190844 | * | 4/2013 |
|---|---|---|---|
| JP | 2015/027263 | * | 2/2015 |

OTHER PUBLICATIONS

Cronk, "RiceWrap's Slice of Rice", Feb. 14, 2014, http://www.cravelocal.com/food-drink/ricewraps-slice- of- rice-lets-you-roll-your-own-sushi, p. 1.*
Van Pelt, The Gothic Gourmet (TM), 2014, "Slice of Rice " TM, pp. 1 and 12.*

* cited by examiner

*Primary Examiner* — Helen F Heggestad
(74) *Attorney, Agent, or Firm* — Olympic Patent Works PLLC

(57) ABSTRACT

The current document is directed to methods and systems for manufacturing frozen-sushi food products that remain texturally and compositionally stable while frozen and refrigerated for extended periods of time. A variety of different processing steps and ingredients are employed to prevent retrogradation of gelatinized starch in cooked sushi rice, including quick cooking of the rice, employing non-nutritive sweeteners in place of sugar, controlling the amount of salt in the sushi rice, and use of β amylase and gellan gum.

2 Claims, 16 Drawing Sheets sucralose

METHOD AND SYSTEM FOR MANUFACTURING FROZEN SUSHI THAT REMAINS STABLE UNTIL CONSUMPTION FOLLOWING THAWING AND REFRIGERATION

CROSS-REFERENCE TO RELATED APPLICATIONS

This application is a continuation-in-part of application Ser. No. 13/601,189, filed Aug. 31, 2012, which claims the benefit of Provisional Application No. 61/529,713, filed Aug. 31, 2011.

TECHNICAL FIELD

The current document is directed to the manufacture of various types of frozen-sushi prepared foods that can be shipped and stored in freezing and sub-freezing conditions and then thawed and either immediately consumed or refrigerated prior to consumption.

BACKGROUND

Modern sushi was initially created in Japan in the early 1800's. There are many different types of sushi made and consumed in Japan and other Asian countries as well as types of sushi popular in the Americas and Europe. Cooked, vinegared rice is a common ingredient to all of the different types of sushi. In Japanese sushi, the cooked vinegared rice is prepared from white, short-grain Japanese rice mixed with rice vinegar, sugar, and salt. It is generally cooled to room temperature following cooking and then combined with additional ingredients, including nori black seaweed wrappers, various types of seafood, various types of vegetables, and other ingredients. While all of these ingredients contribute to the taste and texture of sushi, the taste and texture of sushi rice is often a significant contributor or the main contributor to the overall perception, to sushi consumers, of the quality and freshness of sushi products.

As sushi has become more and more popular around the world, and as the demand for sushi has correspondingly increased, attempts have been made to prepare frozen sushi products in order to achieve the same mass-production and mass-distribution efficiencies as obtained with other frozen, processed food products. Many of the ingredients in sushi can be successfully frozen and subsequently thawed without significantly degrading their taste and texture. However, until the development of the processes and systems to which the current document is directed, there has been no satisfactory method for freezing sushi rice. The taste and texture of rice significantly degrades while the rice is frozen and refrigerated, rendering thawed, thawed and refrigerated, and heated frozen sushi unsatisfactory to sushi consumers. The degradation of sushi rice is particularly prevalent in commercial environments, in which frozen-storage and refrigeration units often fail to maintain constant temperatures, leading to fluctuating temperatures, fluctuating humidity, and even to multiple unintended freeze/thaw cycles.

SUMMARY

The current document is directed to methods and systems for manufacturing frozen-sushi food products that remain texturally and compositionally stable while frozen and refrigerated for extended periods of time. A variety of different processing steps and ingredients are employed to prevent retrogradation of gelatinized starch in cooked sushi rice, including quick cooking of the rice, employing non-nutritive sweeteners in place of sugar, controlling the amount of salt in the sushi rice, and use of amylase and gellan gum.

DETAILED DESCRIPTION

As discussed above, sushi is a popular food product that was originally developed in southeast Asia as a fermented food product. Modern, non-fermented sushi was developed in the early 1800's in Japan as an early form of convenience food that can be quickly prepared and eaten by hand. The traditional sushi ingredients, including vinegar, provide preservative-like characteristics that allow sushi to remain stable at room temperatures for significantly longer periods of time than non-preserved, processed foods. However, when sushi is frozen, these same ingredients turn out to promote retrogradation of the gelatinized starch produced by cooking sushi rice, leading to loss of hydration, staleness, unpleasant textures, and unpleasant odors.

Prior to research and development efforts that were undertaken to create the currently disclosed methods and systems for preparing stable frozen sushi, previous attempts to manufacture frozen-sushi products were commercial failures. Although many different approaches have been tried to created sushi products that can be frozen for shipment and storage, the failure to recognize that traditional sushi ingredients, while having preservative characteristics at room temperature, promote retrogradation of gelatinized starch at freezing temperatures resulted in sushi products susceptible to retrogradation. In addition, improper concentrations of salt in sushi food products may promote deterioration of the products even at refrigeration temperatures. For example, attempts have been made to replace sucrose with other types of carbohydrate sweeteners, including trehalose. However, like the sucrose for which trehalose has been substituted, trehalose and other carbohydrate sweeteners promote retrogradation of gelatinized starch in the same fashion as retrogradation is promoted by sucrose at freezing and below freezing temperatures. Salt, by contrast, when used at an appropriate concentration, inhibits retrogradation of gelatinized starches at refrigeration temperatures of between 32° Fahrenheit and 40° Fahrenheit. However, at higher concentrations, salt may induce an unpleasant, gummy texture in sushi rice. Until the research and development efforts that produced the currently disclosed process were carried out, it was not known that carbohydrate sweeteners promote retrogradation of sushi rice at freezing and below-freezing temperatures and it was not known that a proper concentration of salt inhibits retrogradation of gelatinized starches at refrigeration temperatures of between 32° Fahrenheit and 40° Fahrenheit.

Figure 1:
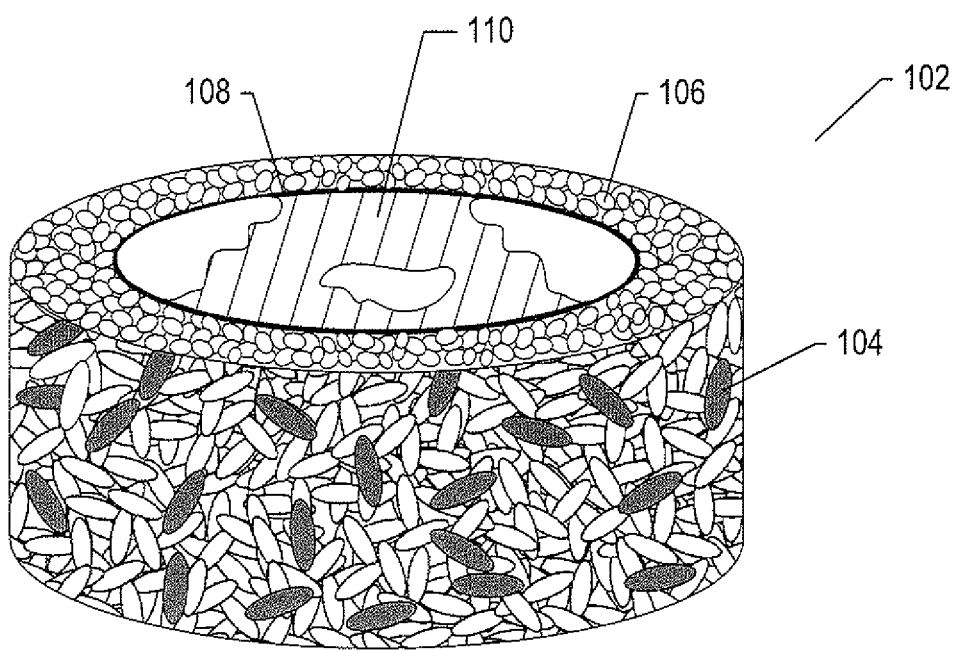
FIG. 1 illustrates a sushi food product, prepared by the currently disclosed methods and systems, that is stable when frozen and refrigerated, allowing the frozen sushi food product to be mass produced in a commercial facility, frozen, and distributed as a frozen sushi food product over large geographical areas, and stored in freezing and refrigeration conditions for significant periods of time prior to thawing and use.

FIG. 1 illustrates a sushi food product, prepared by the currently disclosed methods and systems, that is stable when frozen and refrigerated, allowing the frozen sushi food product to be mass produced in a commercial facility, frozen, and distributed as a frozen sushi food product over large geographical areas, and stored in freezing and refrigeration conditions for significant periods of time prior to thawing and use. The sushi roll 102 is an example of uramaki sushi and is commonly referred to as a "California roll." The California roll has the shape of a cylindrical section with a diameter that typically ranges from 1.5 to 2.5 inches and a height that typically ranges from between 1 and 2 inches. When manufactured by the currently disclosed process, the dimensions are controlled to relatively precise tolerances to produce uniformly dimensioned California rolls having desired dimensions.

The California roll 102 includes an outermost, cylindrical coating of sesame seeds, such as sesame seed 104. This outer coating of sesame seeds coats the curved, vertical surface of a cylindrical of sushi rice. The cylindrical layer of sushi rice 106 overlies an inner, thin cylindrical layer 108 of nori or another type of processed seaweed. An inner solid cylindrical portion of the California roll 110 includes avocado and real or imitation crab, and may additionally include seasonings, mayonnaise, and other ingredients.

Figure 2:
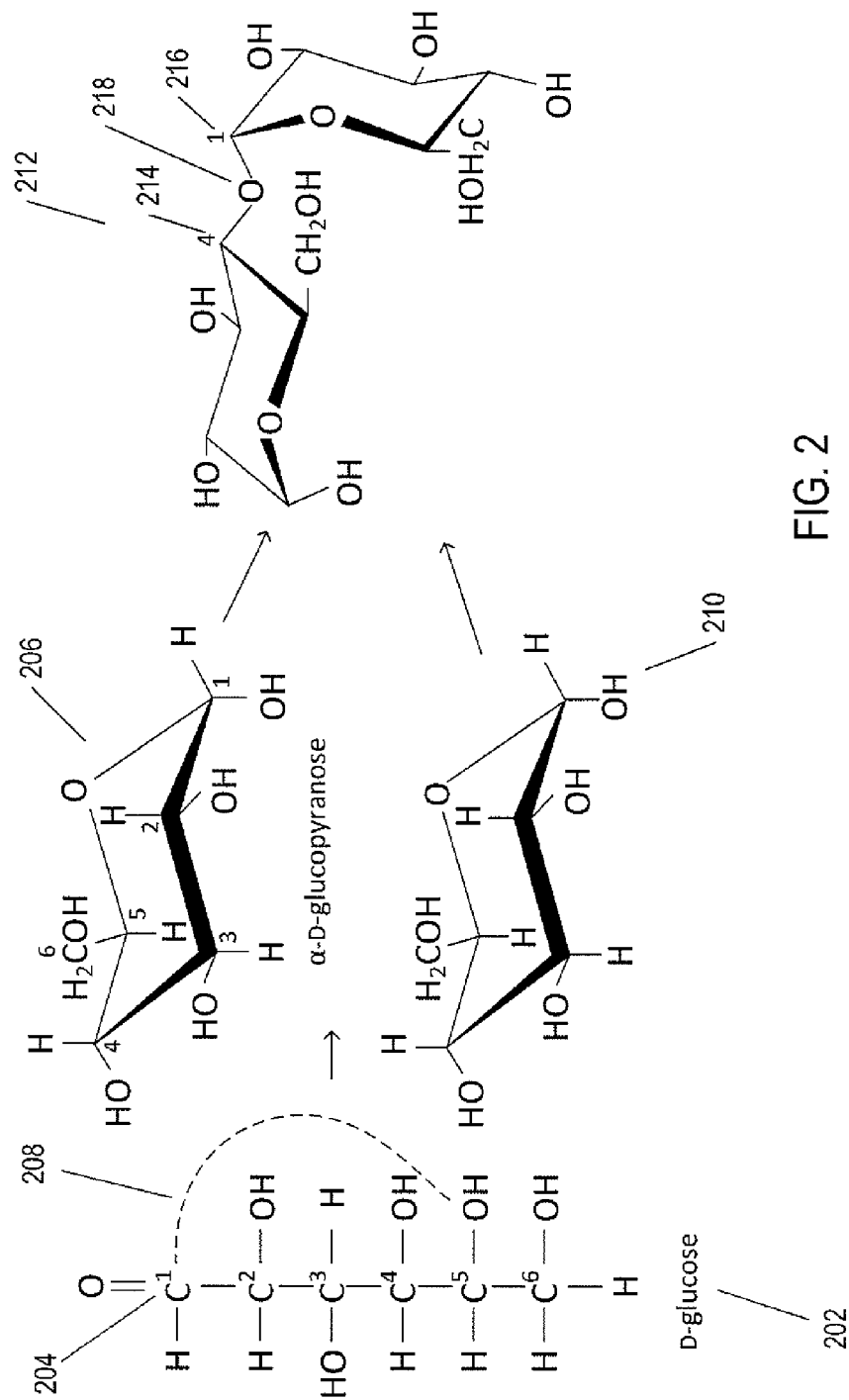
FIGS. 2-3 illustrate two biopolymers, amylose and amylopectin, that together occur in starch.
Figure 3:
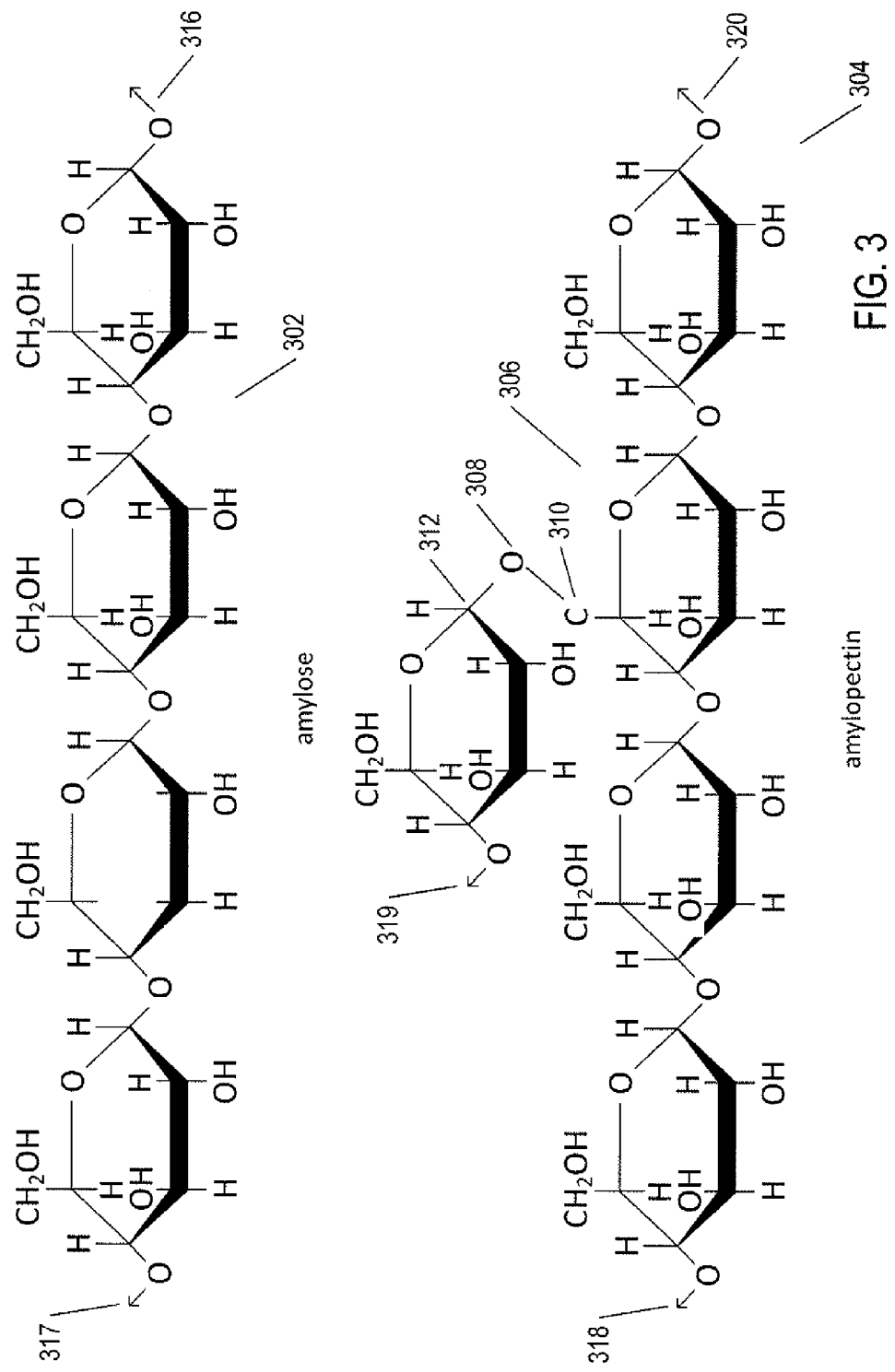

FIGS. 2-3 illustrate two biopolymers, amylose and amylopectin, that together occur in starch. As shown in FIG. 2, the basic chemical unit of both the amylose and amylopectin biopolymers is D-glucose 202. Glucose is a commonly occurring natural monosaccharide. Glucose contains six carbon atoms sequentially numbered 1-6 in FIG. 2. The first carbon atom 204 is part of an aldehyde functional group and the remaining five carbon atoms 206 are bonded to hydroxyl groups. While D-glucose may occur in the open form 202 in solution, it most commonly inhabits a ring-like structure 206 in which the oxygen atom of the hydroxyl group associated with the fifth carbon covalently binds to the first carbon atom 204 to form a hemiacetal, as indicated by the dashed arrow 208 in FIG. 2. The D-glucose molecule is an example of a chiral molecule in which the spatial arrangements of the functional groups as well as the covalent bonding between atoms determines the identity of the monosaccharide. Interchanging the positions of the hydrogen and hydroxyl substituents at one or more of the carbon atoms 2-6 leads to different monosaccharides, including D-allose, D-altrose, D-mannose, D-galactose, and other such different monosaccharides. Formation of the cyclic form of the molecule introduces an additional chiral center at the first carbon atom. When the hydroxyl group is pointed downward, as in the cycle structure 206, the cyclic monosaccharide is referred to as "α-D-glucopyranose." When the hydroxyl group points outward or, in other words, when the hydrogen and hydroxyl group positions are interchanged, the molecule is referred to as "β-D-glucopyranose." Two glucopyranose molecules 206 and 210 can be chemically combined, through a condensation reaction, to produce a variety of different disaccharide molecules, including the disaccharide maltose 212 shown in FIG. 2. In maltose, the fourth carbon atom 214 of one α-D-glucopyranose subunit is attached to the first carbon atom 216 of a second α-D-glucopyranose subunit through an oxygen-atom bridge 218, referred to a s glycosidic linkage." As shown in FIG. 3, the biopolymer amylose 302 is composed of a large number of α-D-glucopyranose subunits linked together as they are linked together in maltose (212 in FIG. 2). The biopolymer amylopectin 304 includes amylose-like chains of α-D-glucopyranose subunits but additionally includes branches in which an α-D-glucopyranose subunit, such as α-D-glucopyranose subunit 306, is additionally linked through an oxygen-atom bridge 308 from the sixth carbon 310 to the first carbon 312 of a different α-D-glucopyranose subunit. In FIG. 3, the arrows 316-320 indicate a continuation of the amylose chain to additional subunits. Amylose biopolymers often include from between 300 and 3000 α-D-glucopyranose subunits while amylopectin often contains between 2000 and 200,000 α-D-glucopyranose subunits. Amylopectin generally includes branch points at every 24 to 30 α-D-glucopyranose subunits and is therefore a highly branched, tree-like biopolymer. Both amylose and amylopectin biopolymers can inhabit various different types of large-scale, secondary structures, including disordered forms as well as helical structures.

Starch is generally composed of both amylose and amylopectin biopolymers. A typical ratio, by weight, is 70 percent amylopectin and 30 percent amylose, but the ratio may differ significantly in different types of plant materials, including rice. Low-amylose rice, for example, may contain 10%, 5%, or less amylose, by weight. Amylopectin has a significantly lower tendency to undergo retrogradation during storage than amylose, as a result of which use of low-amylose rice has been identified, during the research efforts that led to the currently disclosed methods and systems, as contributing to production of stable frozen sushi food products.

Figure 4:
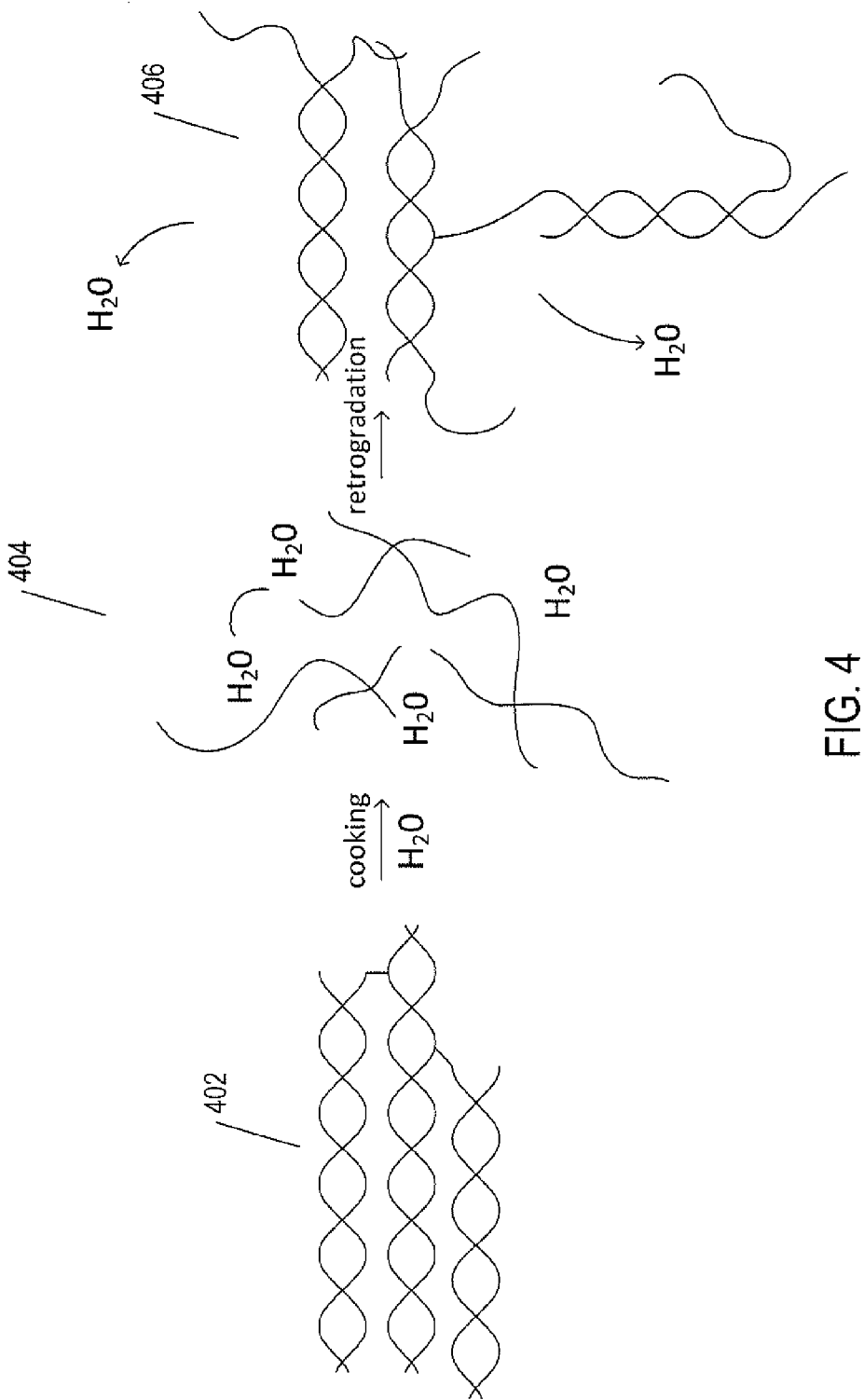
FIG. 4 illustrates retrogradation of starch.

FIG. 4 illustrates retrogradation of starch. As shown in FIG. 4, in a typical plant product, such as a rice grain, the amylose and amylopectin biopolymers that together compose starch are in semi-crystalline state 402 in which the biopolymers have well-ordered, double-helical secondary structures that are arranged in parallel, higher-order supermolecular lattices. Plants and animals use starch to store carbohydrate in a form that does not increase internal osmolarity of plant and animal cells, as would be the case where monosaccharides concentrated within cells as an energy reserve. When carbohydrate energy sources are needed, enzymes, such as the enzyme β amylase, remove disaccharide maltose subunits from the reducing, or hemiacetal, end of amylose and amylopectin biopolymers.

When starch-containing food products are cooked, the amylose and amylopectin biopolymers become disordered and hydrated 404. The crystalline, well-ordered biopolymers 402 become gelatinized or, in other words, disordered and hydrated to form a highly viscous solution 404. However, when the gelatinized starch is cooled, left at room temperature for long periods of time, or frozen, the amylose and amylopectin biopolymers begin to assume a more well-ordered, semi-crystalline state 406 that is the product of the retrogradation process. As the biopolymers re-associate into well-ordered structures, water is expelled from the biopolymers. Retrogradation leads to staleness and a marked change in the texture, taste, and odor of a cooked-starch-containing preparation. Research efforts employed during development of the currently disclosed methods and systems has revealed that the retrogradation process is significantly promoted, at near-freezing, freezing, and sub-freezing temperatures, by the presence of monosaccharide, disaccharide, and polysaccharide sweeteners, such as sucrose, fructose, and trehalose. In addition, suboptimal concentrations of salts, including table salt NaCl, promote retrogradation at refrigeration temperatures of between freezing and 40° Fahrenheit. It is the retrogradation process, discussed above with reference to FIG. 4, that leads to the significant deterioration in frozen sushi products during storage and refrigeration, particularly when temperatures fluctuate, as they often do in commercial frozen-storage and refrigeration environments.

Figure 5:
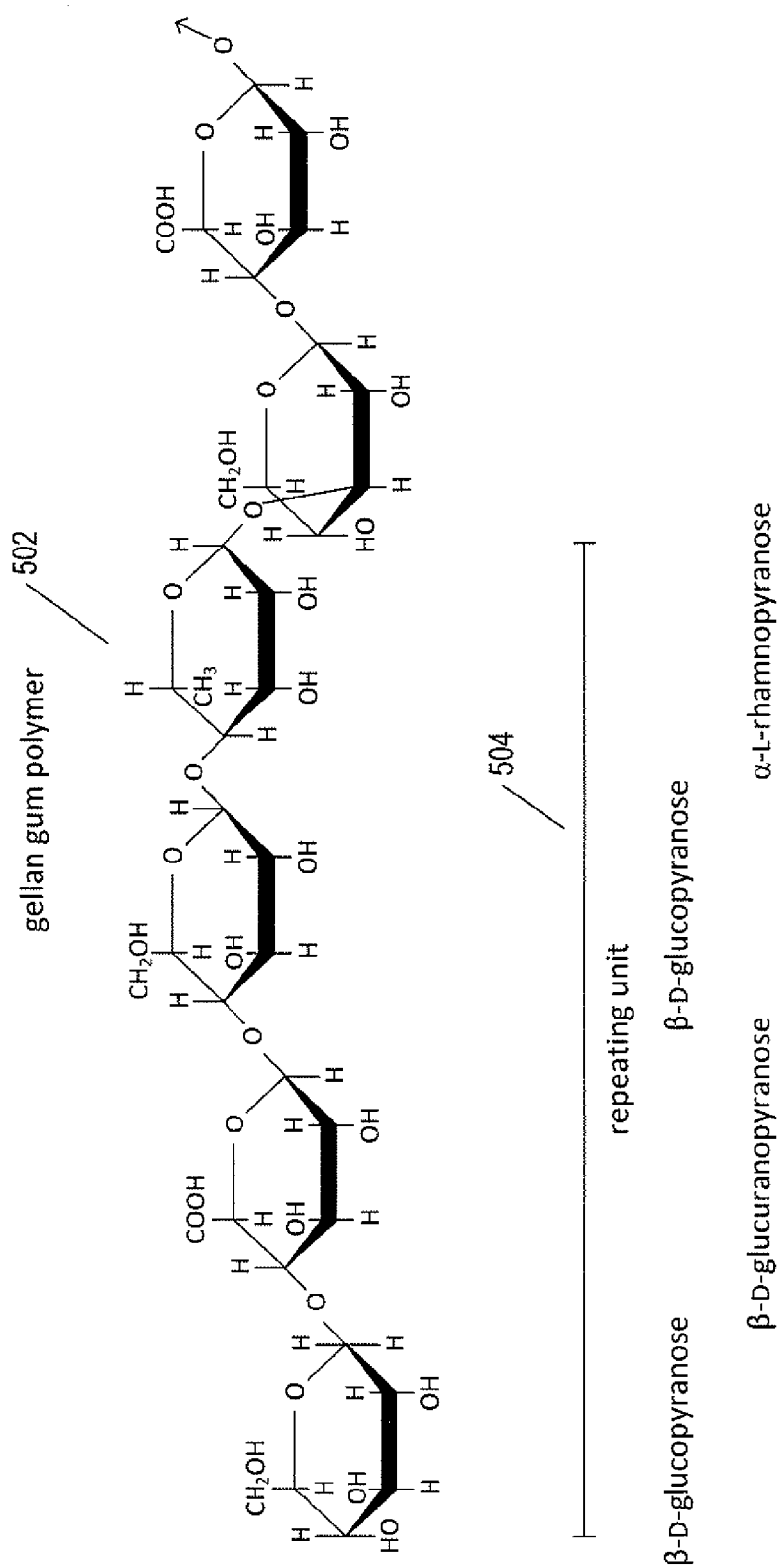
FIG. 5 illustrates the chemical structure of the gellan-gum biopolymer.

FIG. 5 illustrates the chemical structure of the gellan-gum biopolymer. Gellan gum is a water-soluble biopolymer that is used as a gelling agent in a variety of different food products. It is a substitute for agar and is a much more effective gelling agent, by weight, than agar. The gellan-gum biopolymer 502 is a repeating sequence of a tetrasaccharide repeating unit 504 that includes β-D-glucopyranose, β-D-glucuronopyranose, β-D-glucopyranose, and α-L-rhamnopyranose. The four pyranoses within the repeating unit are linked together by β1-4 glycosidic linkages and the repeating units are linked together by α1-3 glycosidic linkages. Gellan gum comes in two commercial forms: (1) high-acyl gellan gum, which is the native biopolymer; and (2) low-acyl gellan gum, which is prepared by de-esterification of native gellan gum. The native gellan-gum polymer features acetyl and glyceryl esters of certain of the hydroxyl groups of the pyranose subunits. The acetyl and glyceryl esters may be converted into free hydroxyl groups by any of various processes.

Figure 6:
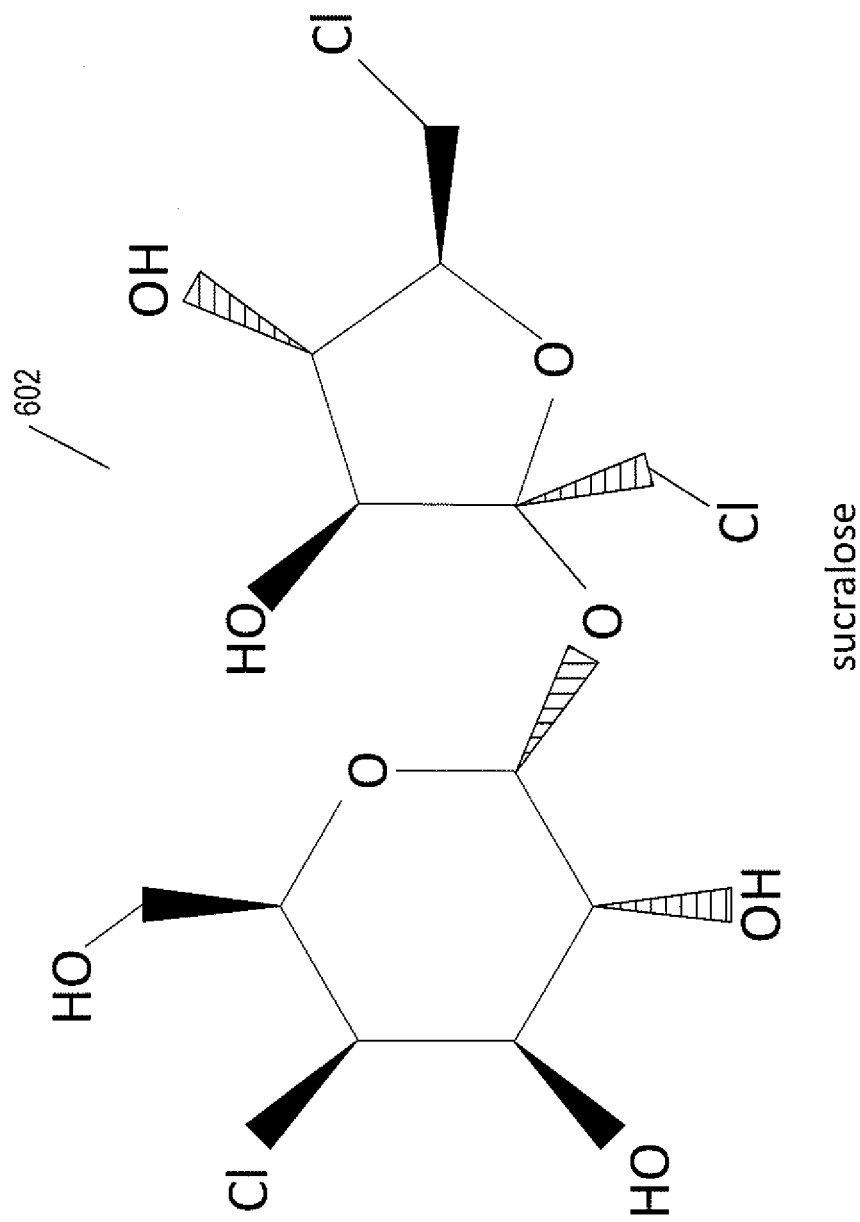
FIG. 6 illustrates the chemical structure of the artificial, non-nutritive sweetener sucralose.

FIG. 6 illustrates the chemical structure of the artificial, non-nutritive sweetener sucralose. Sucralose 602 is between 300 and 1000 times sweeter than sucrose, twice as sweet as saccharine, and three times as sweet as aspartame. It is stable over a wide range of temperature and pH conditions. Sucralose is one example of a non-nutritive sweetener that can be used, in place of sugar or other carbohydrate-based sweeteners, in the preparation and processing of rice for frozen sushi products in order to prevent or inhibit retrogradation of the sushi rice during frozen storage and refrigeration.

FIGS. 7-16 illustrate the manufacture of a frozen-sushi food product using the methods and systems to which the current document is directed. First, low-amylose, sweet rice is soaked for two or more hours in cooking solution. The cooking solution is prepared by combining water and low-acyl gellan gum in the ratio 8.5 lbs. of water and 20 g of low-acyl gellan gum. Variations in this ratio are possible, including 15 g-25 g of low-acyl gellan gum to 8.5 lbs. of water, 10 g-30 g of low-acyl gellan gum to 8.5 lbs. of water, 10 g-50 g of low-acyl gellan gum to 8.5 lbs. of water. The low-acyl gellan gum complexes with low amylose rice to provide a pleasant, non-sticky texture and body to the cooked rice. Soaking the rice prepares the rice kernels for fast cooking, and fast cooking is a significant contributor to the preparation of stable frozen-sushi food products.

Figure 7:
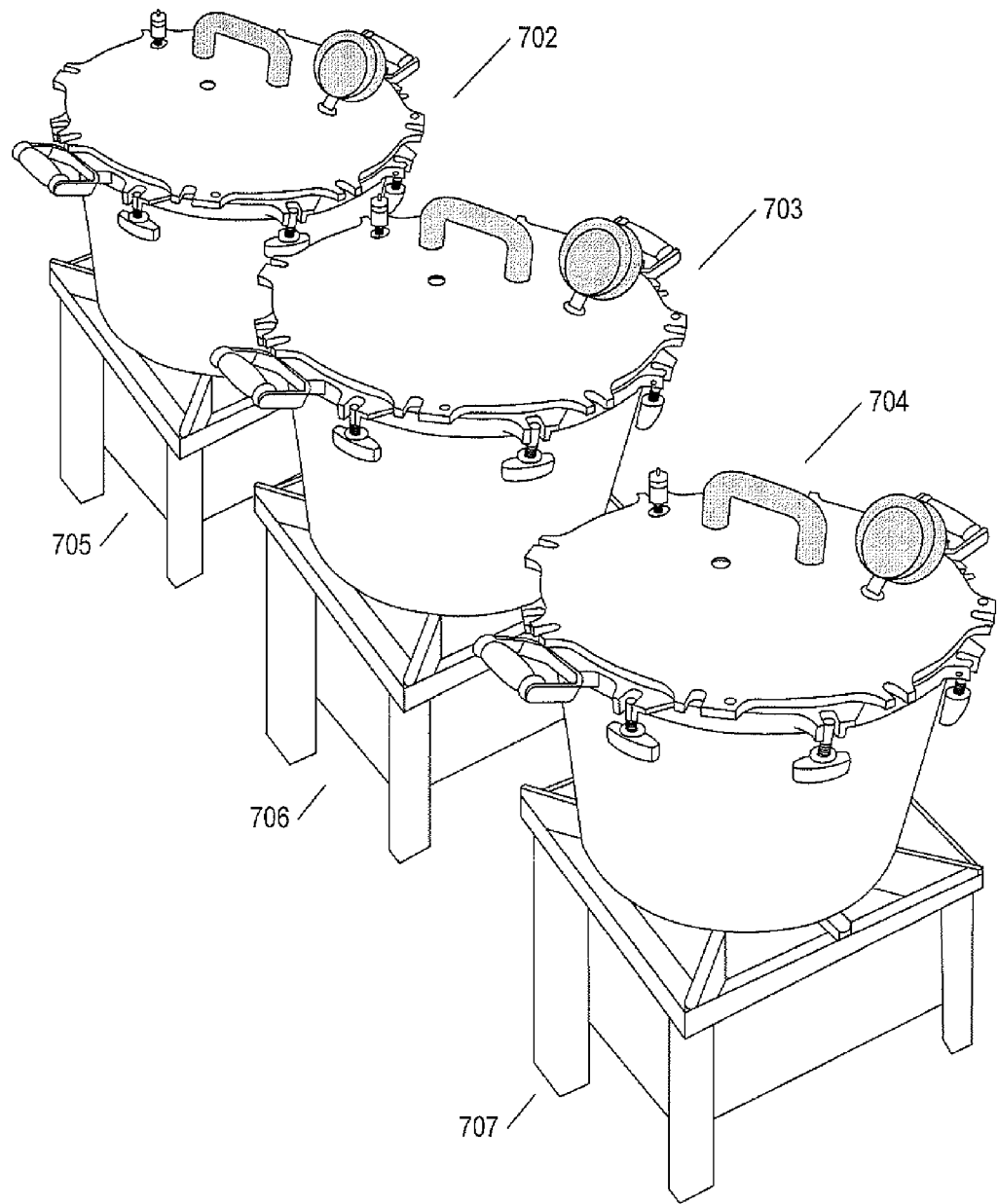
FIGS. 7-16 illustrate the manufacture of a frozen-sushi food product using the methods and systems to which the current document is directed.

Next, the soaked rice is cooked. FIG. 7 illustrates the rice-cooking subsystem employed in one commercial implementation of the frozen-sushi manufacturing process. The rice is cooked in a series of large pressure cookers 702-704. Each pressure cooker is heated by a natural-gas heating unit that emits greater than 200,000 British Thermal Units ("BTUs") per hour. In FIG. 7, the natural-gas heating units reside below and within metal heating stands 705-707. The solution for cooking is preheated within the pressure-cooker pots to boiling. It is important that the cooking solution is preheated in order to reduce cooking times. In addition, the soaked rice is placed in stainless-steel mesh-like vessels that are lowered into the pressure-cooked pots so that the rice does not come into contact with the sides of the pressure-cooker pots. Isolation of the rice from the pressure-cooker-pot surfaces ensures that the rice is uniformly heated, during the cooking process, and that an external layer of rice is not burnt, caramelized, or otherwise deleteriously affected by the high heat present on the pressure-cooker pot surfaces. The pressure cookers are sealed and the rice is cooked for seven minutes at 15 pounds per square inch ("psi"). The cooking times and pressures may vary with pressure-cooker volumes, heat sources, and other such parameters. In one alternative implementation, the cooking times may vary from 6 to 8 minutes and the pressure may vary from 10 psi to 20 psi. Following cooking, the pressure cooker is removed from the heat source and allowed to stand for ten minutes. The standing time may vary, in additional implementations, from 8-12 minutes, from 7-14 minutes, from 6-15 minutes, and for longer time periods. In additional implementations, commercial rice cookers may be used in place of pressure cookers.

A next step involves addition of a vinegar solution to the cooked rice. The vinegar solution is prepared by combining five percent white distilled vinegar, salt, water, sucralose, and high-acyl gellan gum in the ratios:
  570 g of 5% white distilled vinegar;
  90 g salt;
  1040 g water;
  0.7 g sucralose; and
  20 g high-acyl gellan gum.
These ratios may vary with different implementations. The vinegar content may, for example, vary from 560 g to 580 g, from 550 g to 590 g, and from 530 g to 610 g. The salt content may vary from 85 g to 95 g. The sucralose content may vary from 0.5 g to 0.8 g or from 0.4 g to 1.0 g, and the high-acyl-gellan-gum concentration may vary from 15 g to 25 g or from 10 g to 30 g, in alternative implementations. As discussed above, the sucralose is a non-nutritive sweetener that replaces sucrose, which is commonly used in sushi rice, and which replaces the various monosaccharide, disaccharide, and polysaccharide sucrose substitutes that have been tried in various commercial sushi products. The amount of salt added to the vinegar solution is calculated to form a weak association with amylopectin that, in turn, facilitates an association with the gellan gum that prevents strong amylopectin/salt complexes that render cooked rice gummy and unpleasant. The high-acyl gellan gum provides a pleasant, elastic texture to the cooked rice and renders the cooked rice more durable with respect to mechanical processing.

An additional enzyme solution is used in the second step. The enzyme solution is prepared by combining water with the enzyme β amylase in the ratio:
  1100 g water; and
  7.5 g β amylase.
The β amylase inhibits retrogradation at refrigeration temperatures and also cleaves the amylopectin biopolymer to weaken amylopectin gellation and reduce the gummy texture of the cooked rice. In alternative implementations, the amount of β amylase may vary from 7.0 g to 8.0 g, 6.5 g to 8.5 g, or from 6.0 g to 9.0 g.

Figure 8:
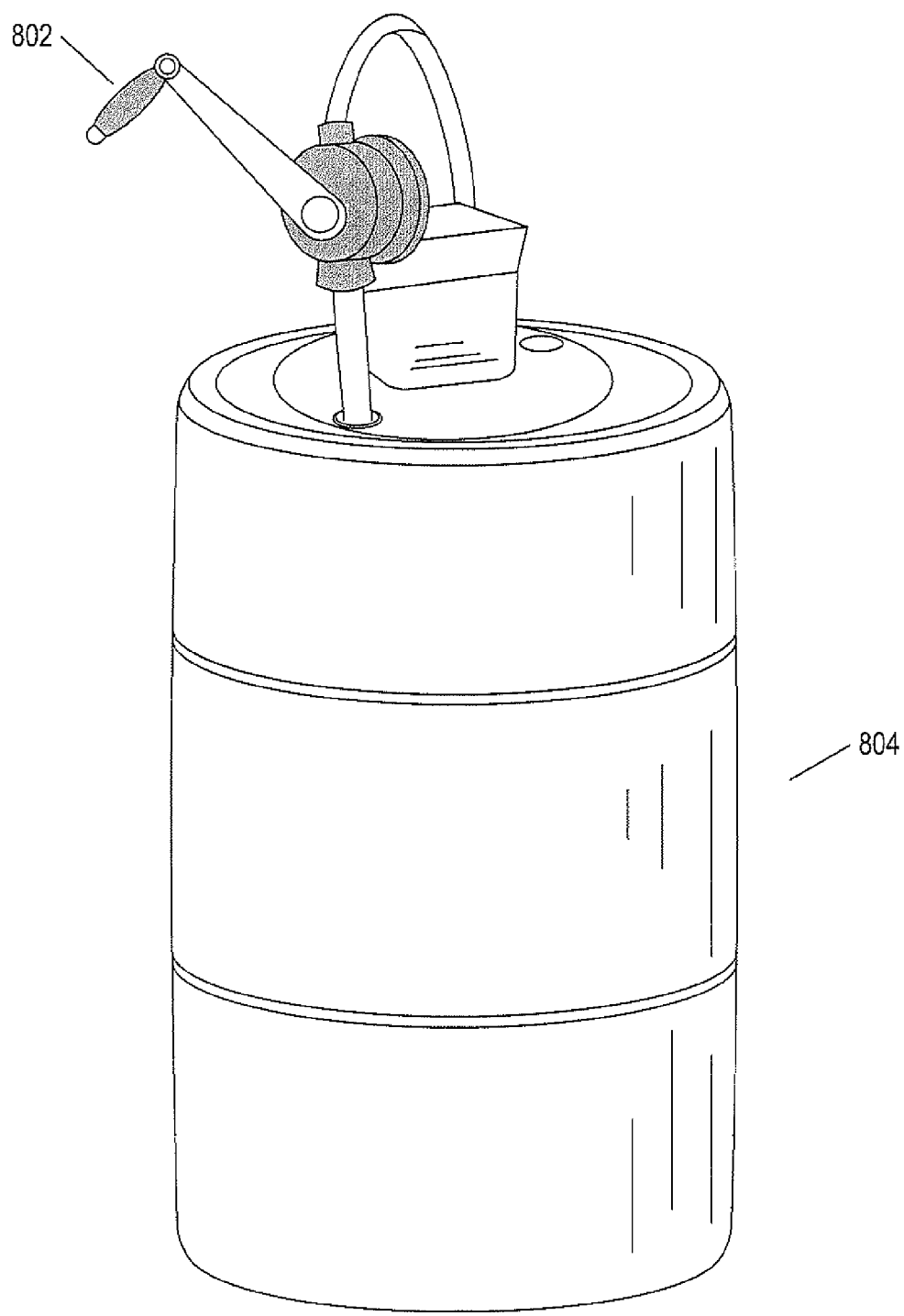

FIG. 8 illustrates a drum containing prepared vinegar solution. The above-described vinegar solution is hand-pumped using a pump handle 802 from the vinegar-solution-containing drum 804. After the cooked rice has stood for ten minutes in the pressure cooker, the pressure is relieved and the pressure-cooker lid is removed from the pressure-cooker pot. Vinegar solution is combined with the cooked rice until the vinegar solution is evenly distributed among the rice grains and the rice temperature has cooled to 160° F. In alternative implementations, the temperature may vary from 155-165° F., 150-170° F., 130-170° F., or 120-180° F. At this point, enzyme solution is added to the rice and mixed into the rice until the rice is evenly distributed. The above-described ratios for the ingredients of the vinegar solution and enzyme solution describe the amount of vinegar solution and enzyme solution used for each ten pounds of uncooked, low amylose sweet rice.

Figure 9:
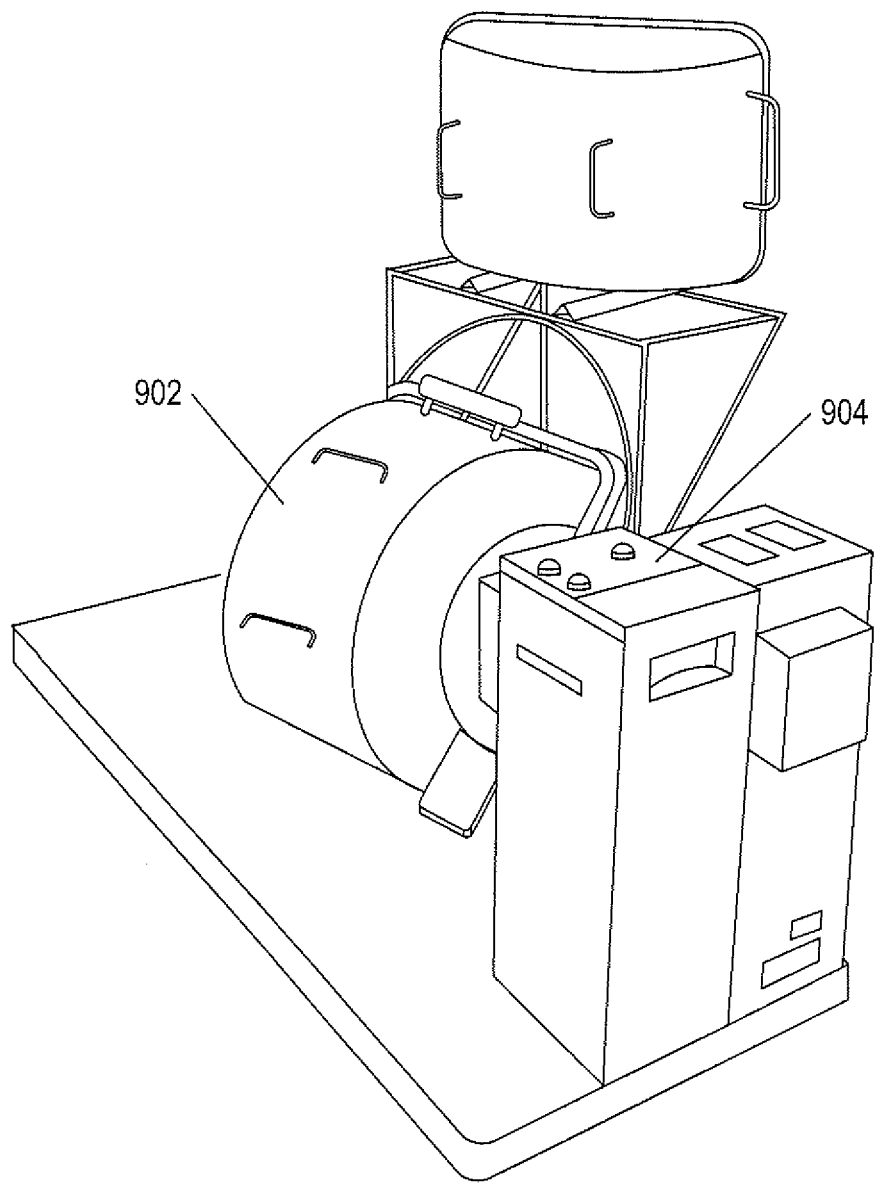

FIG. 9 illustrates a mixing subsystem used in one commercial implementation of the frozen-sushi manufacturing process to evenly mix the vinegar and enzyme solutions within the cooked rice. The rice, vinegar solution, and enzyme solution are loaded into a rotating drum 902 that is spun at a speed and for a time selected via an operation console 904.

Figure 10:
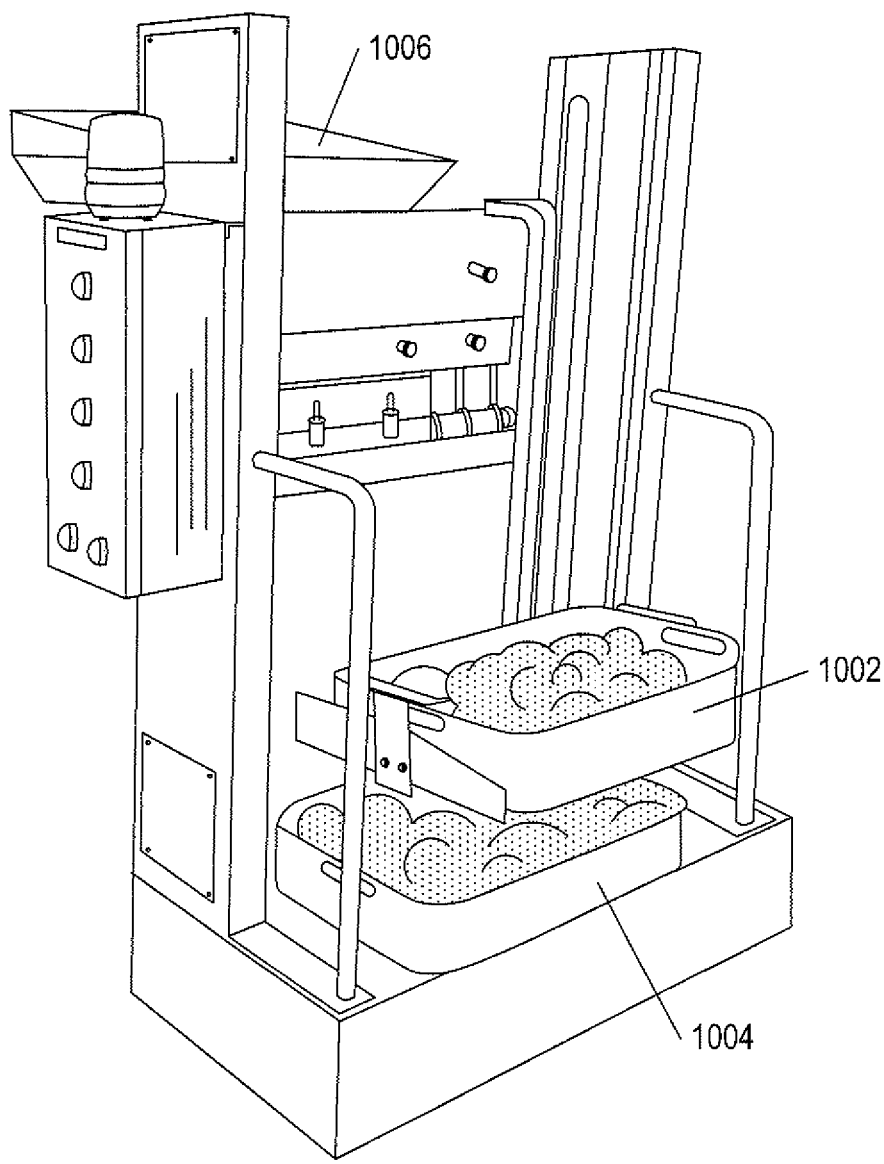

FIG. 10 shows the loading assembly of an initial processing subsystem for preparing frozen sushi. Once the rice, vinegar solution, and enzyme solution have been thoroughly mixed, the rice is loaded into large rectangular pans. The rectangular pans 1002 and 1004, including cooked rice, are loaded onto a vertical conveyor that raises the rectangular pans up and over to pour the cooked rice into a hopper 1006 at the top of the loading assembly of the initial processing subsystem.

Figure 11:
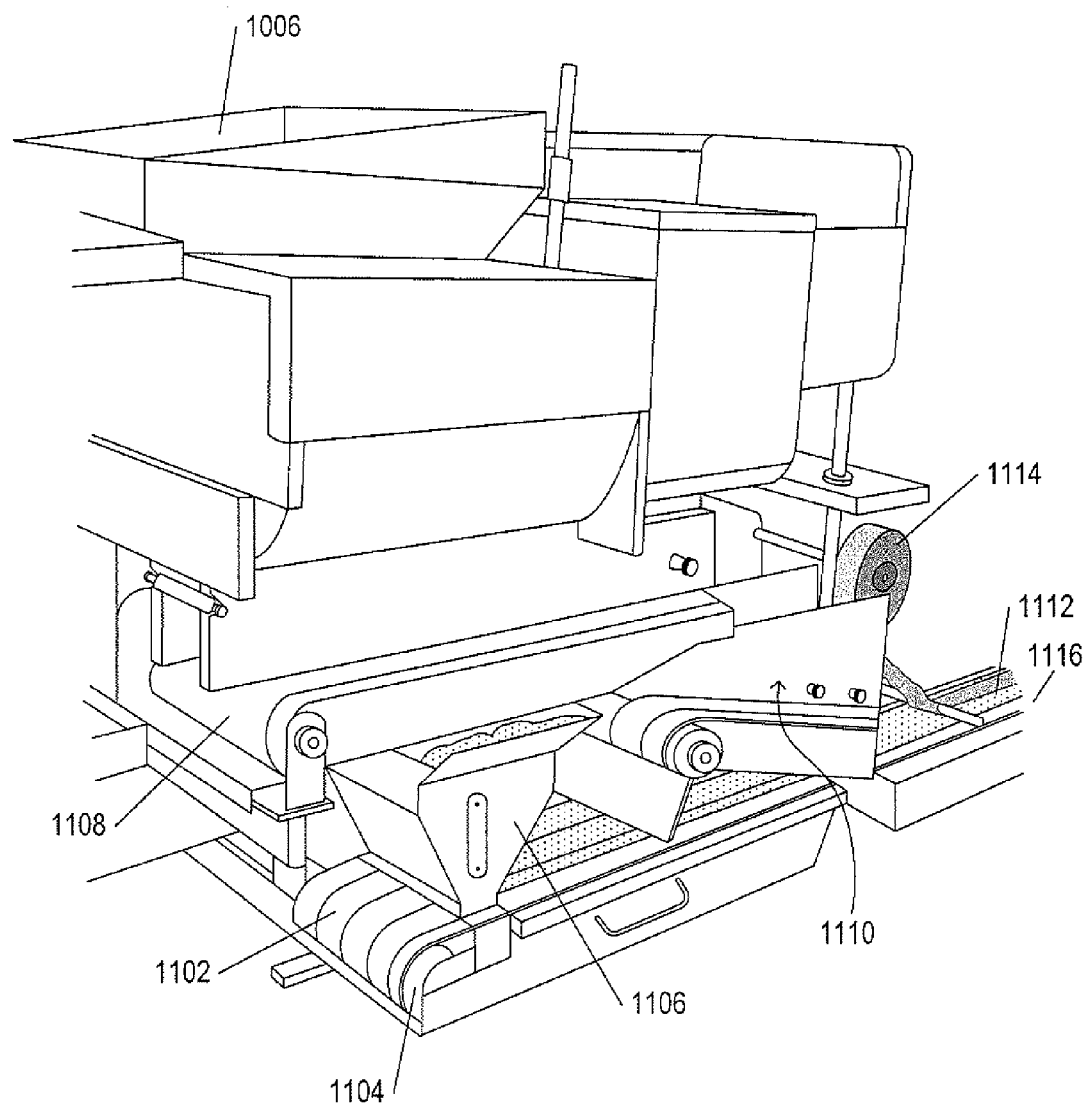

FIG. 11 illustrates the first processing subsystem in a side view. As discussed above with reference to FIG. 10, the rice is raised and dumped into a hopper 1006 at the top of the processing subsystem. A long, pliable conveyor belt 1102 extends from a roller 1104 in the lower portion of the processing subsystem outward to additional downstream processing subsystems. Sesame seeds are contained in a second hopper 1106 and are evenly distributed across the pliable conveyor belt as the conveyor belt moves from the roller 1104 underneath the hopper 1106 containing the sesame seeds. Rice from hopper 1006 is spread onto one or more upper, short conveyor belts 1108 and 1110 and evenly layered over the sesame seeds on the long, pliable conveyor belt 1102. Nori seaweed wrap 1112 is layered on top of the rice layer, distributed from a large rotating roll 1114 of nori seaweed wrap. Thus, the long pliable conveyor, as it exits from the first processing subsystem 1116, contains a bottom layer of sesame seeds, an intermediate layer of cooked rice, and a top layer of nori seaweed wrap.

Figure 12:
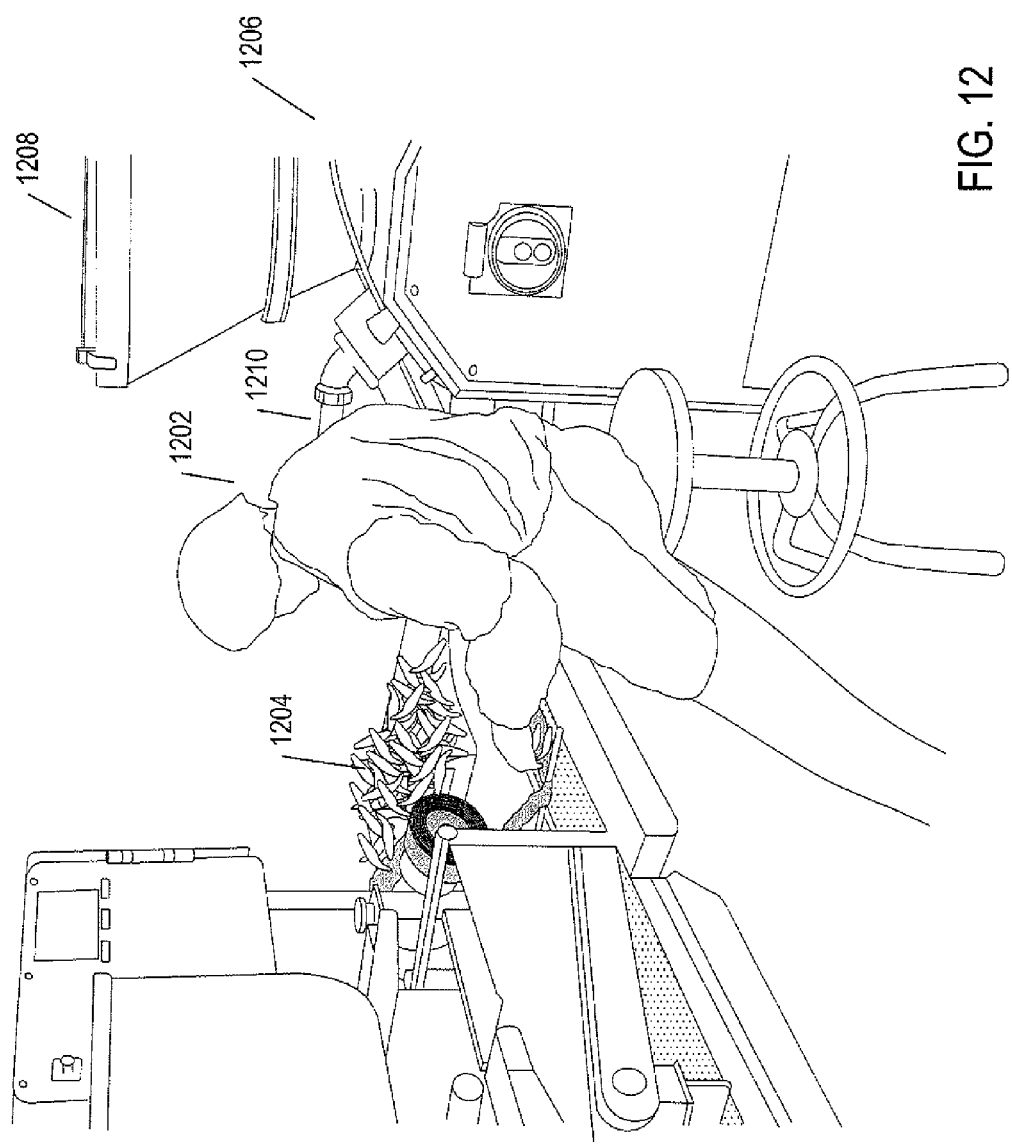

FIG. 12 shows a next step in manufacture of the frozen-sushi product. As shown in FIG. 12, a processing employee 1202 places peeled and sectioned avocado 1204 and, in certain implementations, any other vegetable, fish, or shellfish ingredients, onto the top of the nori-seaweed-wrap layer moving along the long, pliable conveyor belt. A next processing subsystem 1206 includes a hopper 1208 filled with imitation-crab mixture. The imitation-crab mixture is forced under pressure through a dispensing tube 1210.

Figure 13:
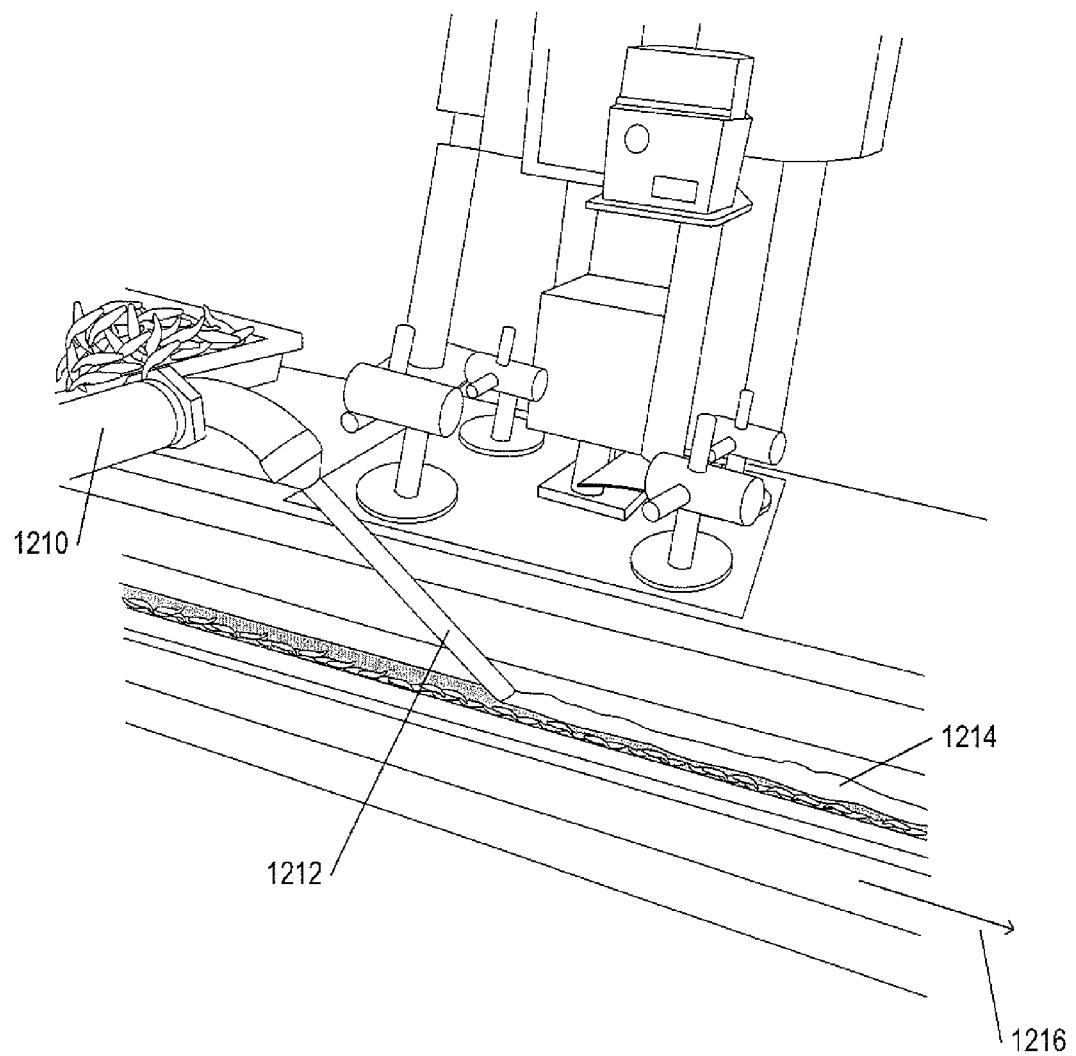

FIG. 13 illustrates application of the imitation-crab mixture to the avocado/nori-seaweed-wrap layer of the nascent, continuous, multi-layer frozen sushi traveling along the extended pliable conveyor belt. The imitation crab is forced through the dispensing tube 1210 and a dispensing tub nozzle 1212 to form a continuous roughly cylindrical layer 1214 of imitation-crab mixture above the avocado/nori-seaweed-wrap layer as the pliable conveyor belt continues to move forward in the indicated direction 1216.

Figure 14:
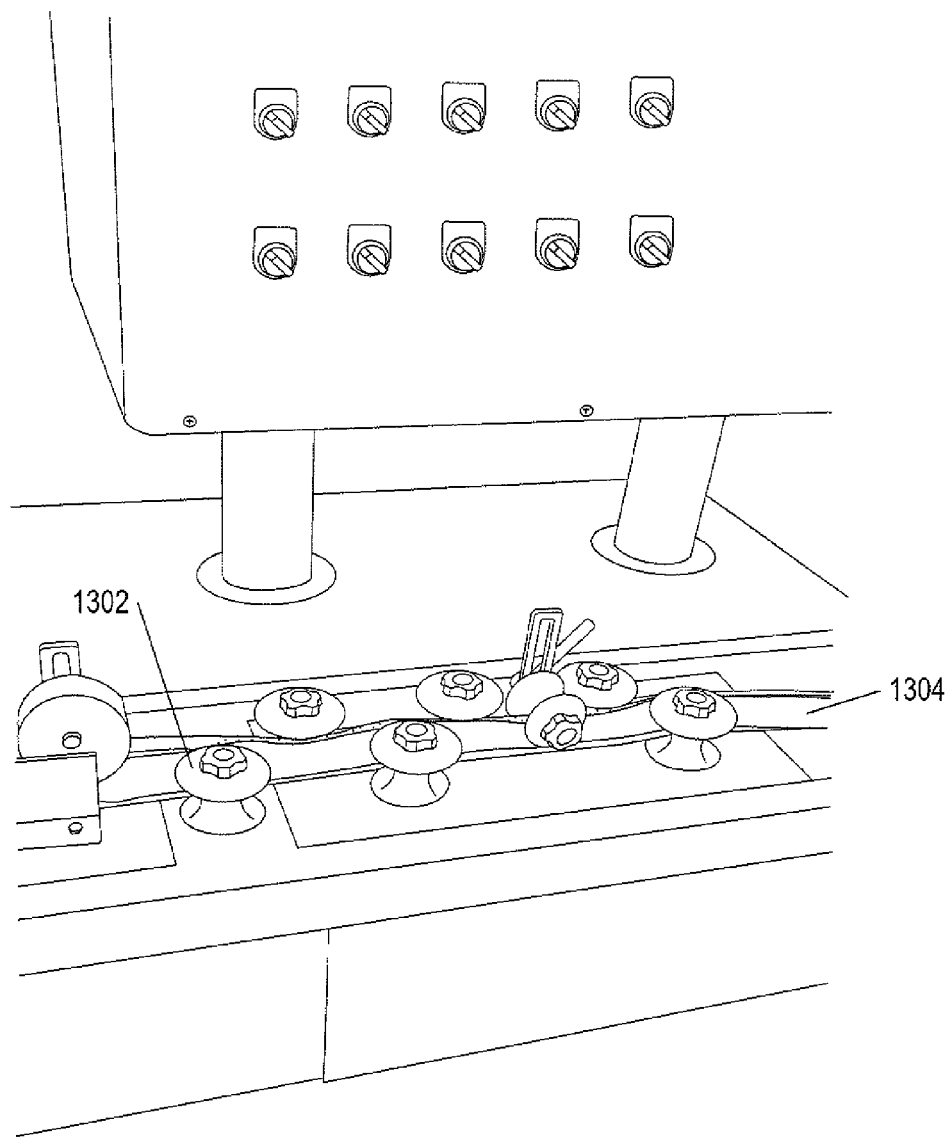

FIG. 14 shows a third processing subsystem. The third processing subsystem includes a series of mechanical rollers, such as mechanical roller 1302, that forces the pliable conveyor belt from a flat shape into a rolled, cylindrical shape 1304, thus rolling the flat layers of sesame seed, cooked rice, nori-seaweed-wrap, avocado, and imitation-crab mixture into a long, continuous sushi roll.

Figure 15:
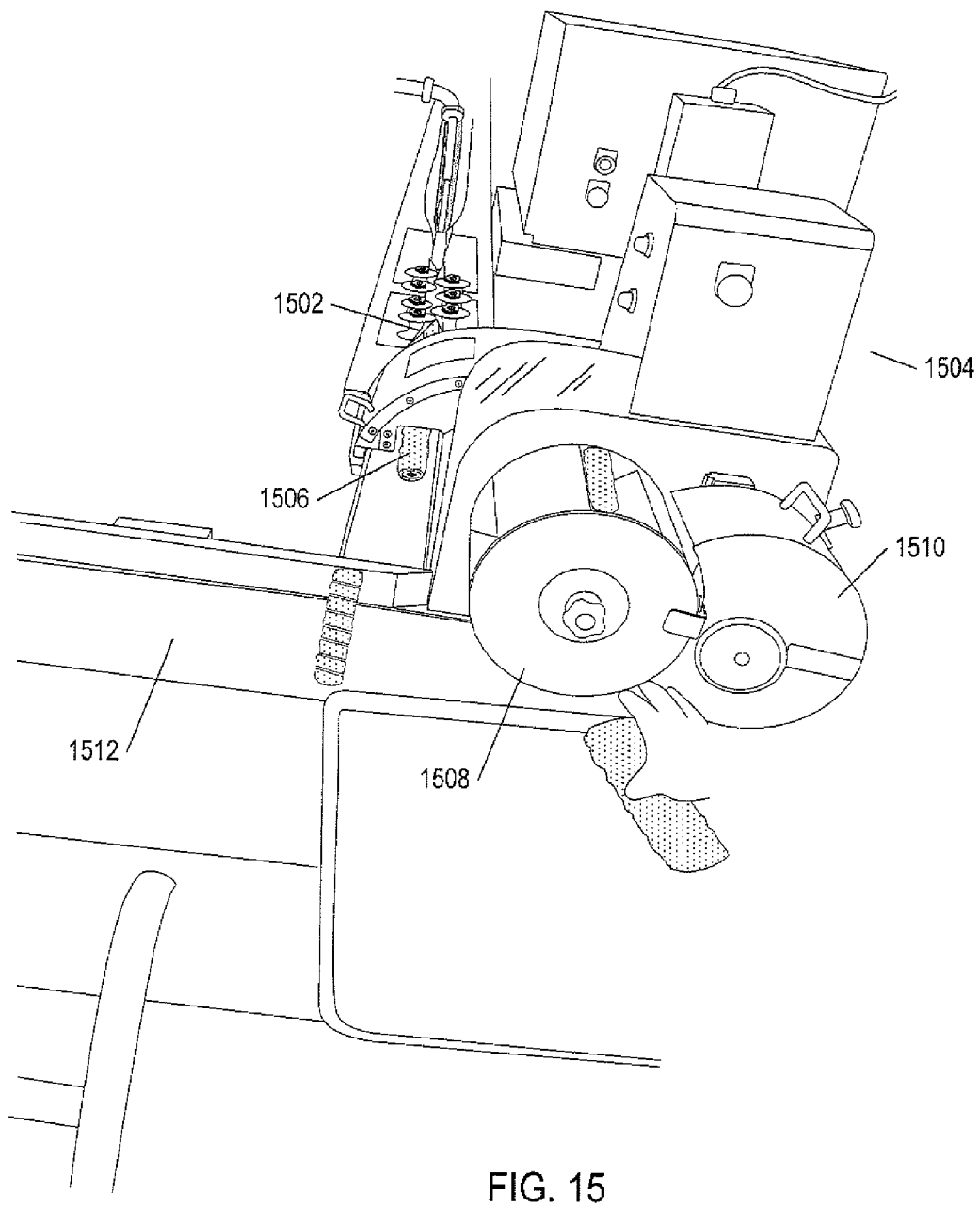
Figure 16:
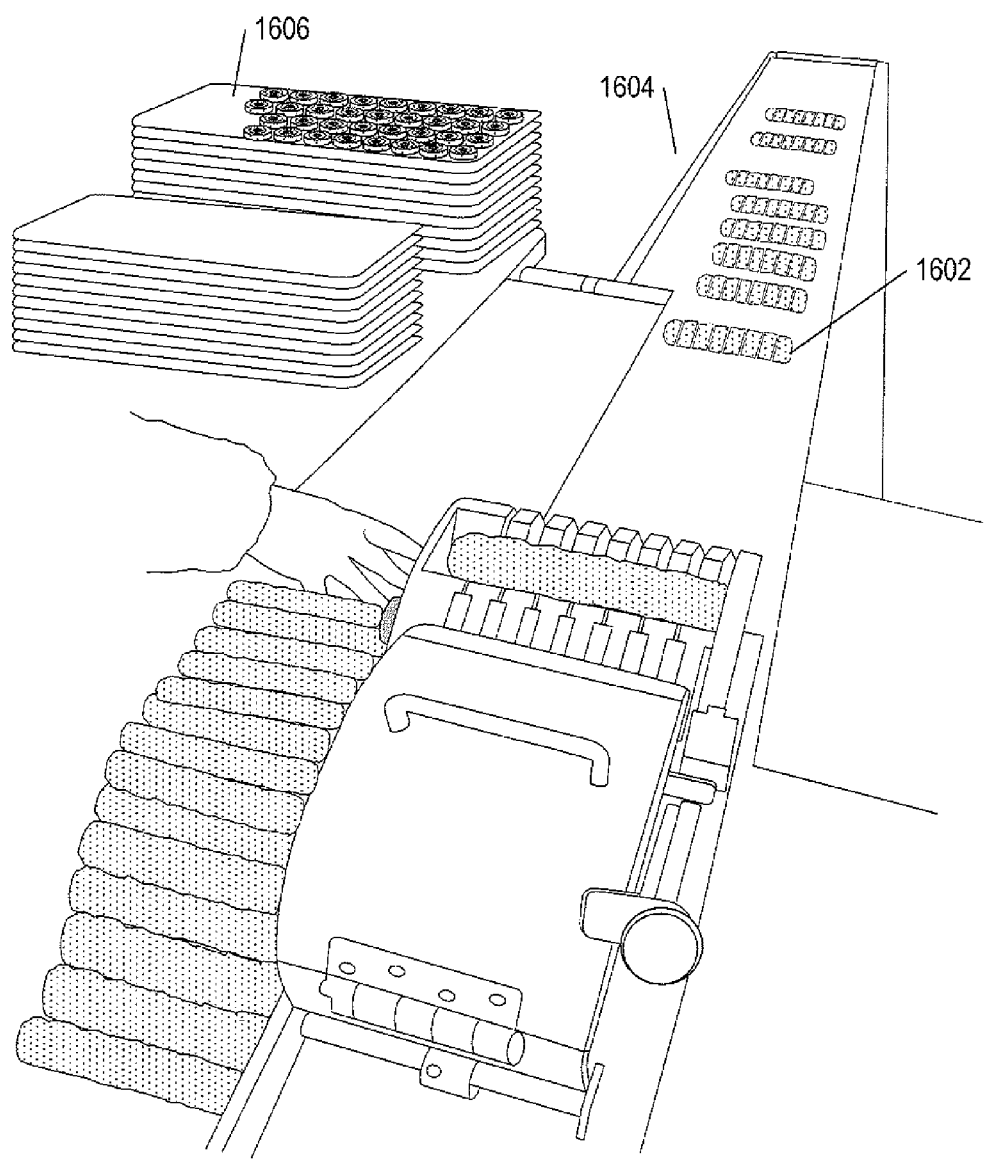

FIG. 15 illustrates a fourth processing subsystem. The long, continuous sushi roll emanating from the mechanical rollers 1502 enters a chopping subsystem 1504 that mechanically chops the long, continuous sushi roll into sushi-roll sections 1506 that are loaded into a rotating drum 1508 and mechanically chopped by a parallel chopping subunit 1510 into the final sushi rolls, illustrated in FIG. 1, which are lowered onto a second long, continuous conveyor belt 1512. FIG. 16 illustrates the fourth processing subsystem and second continuous conveyor belt from a different perspective. As shown in FIG. 16, the chopped, final sushi product 1602 travels along the second conveyor belt to a pickup station 1604 where the sushi rolls are placed onto trays 1606. The trays of sushi rolls are then loaded onto racks and placed into a flash-freezing environment. The frozen sushi can then be packaged for distribution and delivery.

The process illustrated in FIGS. 7-16 can be varied to produce many different types of frozen-sushi food products. Different types of vegetables and seafood can be layered about the nori seaweed wrap to produce different types of California rolls. In addition, ordering of the application of various substances to the long continuous conveyor belt may be altered to produce various different types of sushi, as, for example, sushi products in which the seaweed wrapper forms the outermost layer.

Although the present invention has been described in terms of particular embodiments, it is not intended that the invention be limited to these embodiments. Modifications within the spirit of the invention will be apparent to those skilled in the art. For example, as discussed above, the above-described process can be altered in order to produce many different types of frozen-sushi products. Various different types of non-nutritive sweeteners can be used in place of sucralose and various different types of gel-promoting substances may be employed in addition to, or instead of, gellan gum. Many different types of ingredients can be combined to produce the various different types of frozen sushi. However, to prevent deterioration of the sushi product during freezing, frozen storage, and subsequent refrigeration, carbohydrate-based sweeteners need to be avoided and the salt concentration needs to be carefully controlled, as discussed above.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A process that produces frozen sushi food products that are stable when stored at sub-freezing, freezing, and above-freezing refrigeration temperatures, the process comprising:
   cooking low-amylose, sweet rice;
   combining the cooked rice with a first processing solution that includes water, vinegar, salt, a non-nutritive sweetener, and low-acyl gellan gum by adding the first processing solution and cooked rice to an electromechanical tumbling subsystem that mixes the first processing solution into the cooked rice;
   after addition of the first processing solution to the cooked rice, waiting for the cooked rice to cool to between 130° F. and 160° F., and adding a second processing solution to the mixture of the cooked rice and first processing solution, the second processing solution comprising water and low-acyl gellan gum;

layering the cooked rice with one or more additional food-product layers to form a continuous multi-layered nascent product;

rolling the multi-layered nascent product into a cylindrical, continuous sushi roll;

cutting the continuous sushi roll into individual sushi rolls; and freezing the individual sushi rolls;

wherein the first processing solution is prepared by combining 570 grams of 5% white distilled vinegar,
90 grams of sodium chloride,
1040 grams of water,
0.7 grams of sucralose, and
20 grams of high-acyl gellan gum for addition to a quantity of cooked low-amylose sweet rice that weighed 10 lbs. prior to cooking.

2. A method for preparing sushi rice that is stable when frozen and/or refrigerated, the method comprising:

soaking low-amylose, sweet rice for two hours or more in water;

pressure-cooking the soaked low-amylose, sweet rice for between 6 and 8 minutes at between 10 and 20 psi; and combining the cooked rice with a first processing solution that includes water, vinegar, salt, a non-nutritive sweetener, and low-acyl gellan gum;

after addition of the first processing solution to the cooked rice, waiting for the cooked rice to cool to between 130° F. and 160° F., and adding a second processing solution to the mixture of the cooked rice and first processing solution, the second processing solution comprising water and low-acyl gellan gum;

wherein the first processing solution is prepared by combining 570 grams of 5% white distilled vinegar,
90 grams of sodium chloride,
1040 grams of water,
0.7 grams of sucralose, and
20 grams of high-acyl gellan gum for addition to a quantity of cooked low-amylose sweet rice that weighed 10 lbs. prior to cooking.

\* \* \* \* \*